United States Patent
Cooper et al.

(10) Patent No.: US 10,025,464 B1
(45) Date of Patent: Jul. 17, 2018

(54) SYSTEM AND METHOD FOR HIGHLIGHTING DEPENDENT SLIDES WHILE EDITING MASTER SLIDES OF A PRESENTATION

(71) Applicant: Google Inc., Mountain View, CA (US)

(72) Inventors: Sarah Cooper, New York, NY (US); Shoshana Holtzblatt, New York, NY (US); Ajay Dev Surie, New York, NY (US); Michael Owen Thomas, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 340 days.

(21) Appl. No.: 14/508,468

(22) Filed: Oct. 7, 2014

Related U.S. Application Data

(60) Provisional application No. 61/887,851, filed on Oct. 7, 2013.

(51) Int. Cl.
*G06F 3/0481* (2013.01)
*G06F 3/0482* (2013.01)
*G06F 3/0484* (2013.01)
*G06F 17/24* (2006.01)

(52) U.S. Cl.
CPC ........ *G06F 3/0482* (2013.01); *G06F 3/04812* (2013.01); *G06F 3/04842* (2013.01); *G06F 17/24* (2013.01)

(58) Field of Classification Search
CPC .... G06F 3/0484; G06F 3/04812; G06F 17/30; G06F 17/24
See application file for complete search history.

(56) References Cited

U.S. PATENT DOCUMENTS

| | | | |
|---|---|---|---|
| 7,249,314 B2 * | 7/2007 | Walker | G06F 17/24 715/205 |
| 7,526,726 B1 * | 4/2009 | Skwarecki | G11B 27/034 715/730 |
| 7,546,544 B1 | 6/2009 | Weber | |
| 7,818,678 B2 * | 10/2010 | Massand | G06F 17/2229 715/751 |
| 8,434,002 B1 * | 4/2013 | Shah | G06F 17/212 715/200 |
| 8,516,007 B1 | 8/2013 | Bargas | |
| 2004/0001106 A1 * | 1/2004 | Deutscher | G06F 17/30017 715/838 |
| 2004/0205601 A1 | 10/2004 | Smith | |
| 2006/0053369 A1 | 3/2006 | Kalajian | |

(Continued)

FOREIGN PATENT DOCUMENTS

GB    2473238 A * 3/2011 ........... G06F 3/1446

OTHER PUBLICATIONS

Johnson, Office 2013 on Demand, Jan. 17, 2013, ISBN-10: 0-7897-5049-X (4 pages).

*Primary Examiner* — Steven Sax
(74) *Attorney, Agent, or Firm* — Lowenstein Sandler LLP

(57) ABSTRACT

A presentation document editing system provides master slides that can be associated with one or more other dependent slides in the presentation. When a slide in the presentation is edited, a preview of other slides in the presentation is displayed. When a master slide is edited, any dependent slides are shown in the preview with a visual indicator to distinguish the dependent slides from other slides in the presentation.

20 Claims, 6 Drawing Sheets

(56) References Cited

U.S. PATENT DOCUMENTS

| | | | |
|---|---|---|---|
| 2006/0234765 A1* | 10/2006 | Herberger | G11B 27/034 |
| | | | 455/552.1 |
| 2006/0259875 A1* | 11/2006 | Collins | G06F 17/212 |
| | | | 715/853 |
| 2006/0265659 A1 | 11/2006 | Collins | |
| 2006/0277452 A1 | 12/2006 | Villaron | |
| 2006/0282759 A1 | 12/2006 | Collins | |
| 2006/0282779 A1 | 12/2006 | Collins | |
| 2008/0244401 A1* | 10/2008 | Bala | G06F 9/4446 |
| | | | 715/708 |
| 2009/0076834 A1* | 3/2009 | Rauber | G06F 17/211 |
| | | | 705/1.1 |
| 2009/0276698 A1 | 11/2009 | Clarke | |
| 2010/0114991 A1 | 5/2010 | Chaudhary | |
| 2010/0257456 A1* | 10/2010 | Lieb | G06Q 10/10 |
| | | | 715/741 |
| 2010/0325103 A1* | 12/2010 | Miller | G06F 17/30572 |
| | | | 707/722 |
| 2011/0107223 A1 | 5/2011 | Tilton | |
| 2011/0296300 A1 | 12/2011 | Parker | |
| 2012/0151309 A1 | 6/2012 | Bastide | |
| 2012/0198325 A1 | 8/2012 | Kief | |
| 2013/0132843 A1* | 5/2013 | Marnett | G06F 3/048 |
| | | | 715/723 |
| 2013/0145305 A1 | 6/2013 | Maloney | |
| 2013/0198617 A1 | 8/2013 | Maloney | |
| 2013/0238977 A1 | 9/2013 | Abrahami | |
| 2013/0282808 A1* | 10/2013 | Sadanandan | G06Q 10/10 |
| | | | 709/204 |
| 2014/0258869 A1* | 9/2014 | Thomas | G06Q 10/10 |
| | | | 715/731 |
| 2014/0282013 A1* | 9/2014 | Amijee | G06F 17/30056 |
| | | | 715/732 |

* cited by examiner

SYSTEM AND METHOD FOR HIGHLIGHTING DEPENDENT SLIDES WHILE EDITING MASTER SLIDES OF A PRESENTATION

CROSS REFERENCE TO RELATED APPLICATIONS

This application claims priority to U.S. Provisional Application Ser. No. 61/887,851 filed Oct. 7, 2013, entitled "System and Method for Highlighting Dependent Slides While Editing Master Slides of a Presentation," the entire contents of which are hereby incorporated by reference.

BACKGROUND

Presentation programs may be used to create an electronic document that is used to present information typically including text, images, videos, and other audio or visual elements. One way to maintain consistency throughout the presentation is by use of one or more master slides which can be used to set certain base templates and formatting for use throughout the presentation in one or more dependent slides. When a user edits the master slide of the presentation document, the changes may be propagated throughout related elements in dependent slides. This feature allows the user to make overall changes to an entire presentation document without changing each individual slide. Current presentation applications, however, do not show the user how changes made to the master slide immediately affect any related or dependent slides.

SUMMARY

The systems and methods described herein are directed to providing the user with a preview of slides in a presentation document. The preview includes feedback when making changes to a master slide in a presentation program by presenting a preview of highlighted dependent slides affected by the changes to the master slide and showing how those changes will appear in the dependent slide.

One aspect described herein discloses a method and system for displaying changes to a master slide for a presentation that includes receiving from a user on a client computer, a selection of a portion of a master slide in a presentation document comprising a plurality of slides and identifying a slide in the presentation document that is dependent on the master slide. A display is provided for the user at the client computer of an editable view of the master slide and a preview of the plurality of slides in the presentation document, where the preview of the identified dependent slide includes a visual indicator. The visual indicator may be highlighting the dependent slide or some other indicator that causes the dependent slide to be distinguished from other slides in the presentation document that are not dependent on the master slide.

An edit to the selected portion of the master slide in the presentation document may be received from a user, the edit is applied to the dependent slide, and the preview is displayed showing the dependent slide updated based on the edit to the master slide. The preview of the dependent slide is updated in substantially real time. The view of the master slide and preview of the plurality of slides in the presentation document is provided in a master editing mode for the presentation. Information may be provided identifying any dependent slide, element of a dependent slide, or number of dependent slide. Additional slides may be associated with a master slide and shown in a preview with a visual indicator.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices. In addition, the features of the presentation application described herein could also be implemented in a local application on a client computer.

Aspects of the systems and methods described herein relate to presenting a preview of slides in a presentation document, in particular to slides that are associated or dependent on a master slide. Presentation programs are commonly used to create documents used to present information and generally include text, images, videos, media or other elements. Although the disclosure is discussed with reference to a presentation document, the techniques described herein may be applied to any document type that includes a master, template, or other fixed and related-element document structure.

To produce a presentation that has a consistent layout, a master slide may be used to establish certain formats, fonts, images and other elements that are applied throughout the presentation document. For example, a user may create a title for the presentation document in a master slide that can be used on an initial title slide and that can be set to be included at the top of each, or some set of, subsequent slides. In another example, certain font types and sizes can be used for first list levels, and other fonts and sizes can be used to provide supporting information in lower levels of the list. Generally speaking, when the user creates a presentation document, the user can add slides or pages to the document and establish dependencies and associations to one or more master slides. When a master slide is edited, changes to dependent slides can be viewed by the user in a preview. The preview may include highlighting any dependent slides that are affected by the changes to the master slide. In addition the preview may include updates to the dependent slides based on the changes to the master slide.

Figure 1:
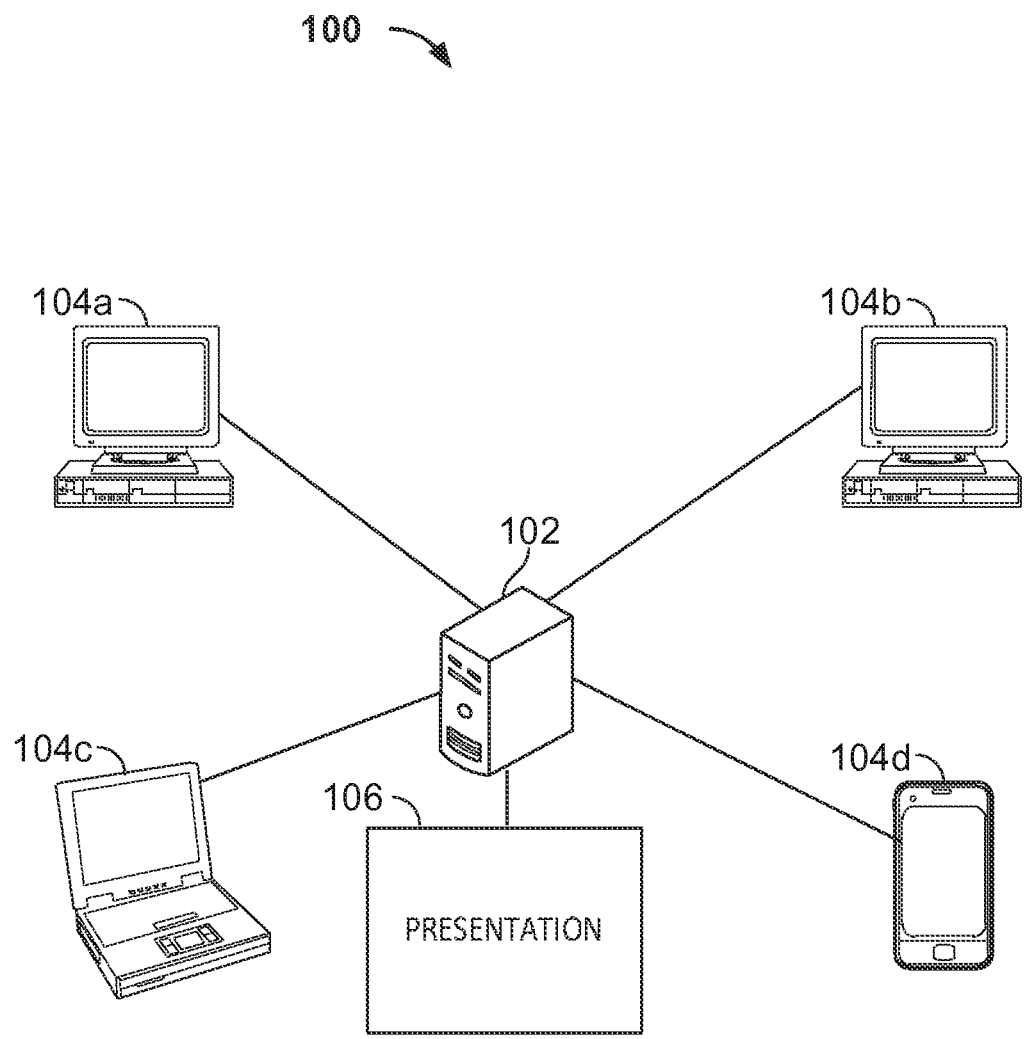
FIG. 1 shows a number of client computers in communication with a cloud computing service storing one or more presentations in accordance with an implementation as described herein.

First, a client-server system in which a number of client computers may connect to a cloud computing service is described. FIG. 1 shows a client-server system 100 that includes cloud computing service 102 and a number of client computers 104a through 104d. Cloud computing service 102 may include one or more servers that collectively provide cloud computing services for a multitude of client computers. Cloud computing service 102 stores a number of files accessible by client computers 104a-104d, including collaborative presentation 106. Users may create, edit, copy, share, and delete files stored on cloud computing service 102. For example, client computers 104a-104d may simultaneously access presentation 106 on cloud computing service 102 using a web browser. Cloud computing service 102 provides each client computer with a local copy of presentation 106, which users on the client computers may view and edit. Edits, sometimes termed mutations, made by client computer 104a are automatically sent to cloud computing service 102 and transmitted to the other client computers 104b-104d. Thus mutations made by one collaborator are immediately seen by other collaborators. Client computers 104a-104d may include desktop computers, laptop computers, tablets, smart phones, mobile electronic devices, or any other device that may connect to cloud computing service 102 through a remote network. System 100 may include many client computers that connect with cloud computing service 102. Cloud computing service 102 and client computers 104a-104d of system 100 are connected through a remote network, such as the Internet. The network connection may be facilitated through a local area network, wide area network, Ethernet, fiber optic network, or any other wired or wireless connection.

Figure 2:
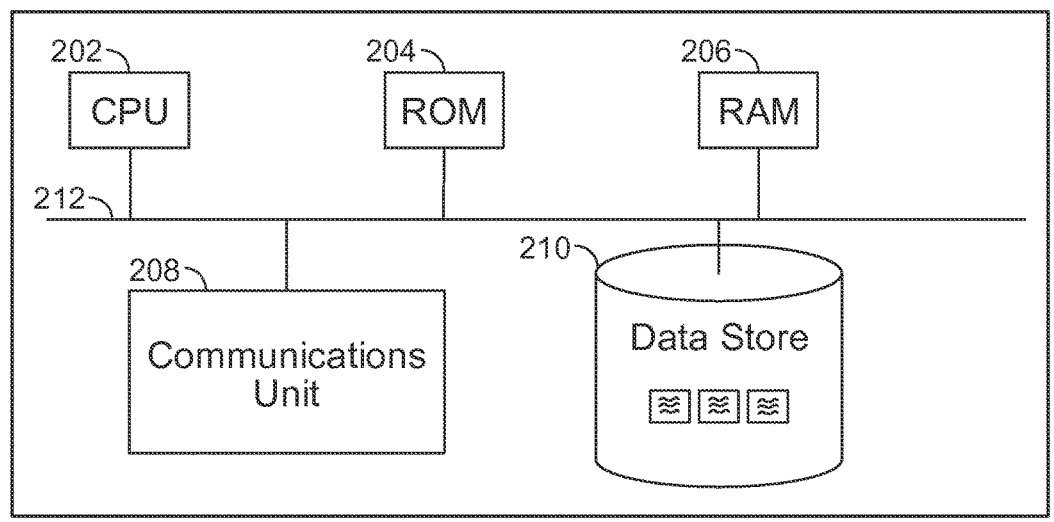
FIG. 2 shows a server implementing a cloud computing service in accordance with an implementation as described herein.

A server for providing a cloud computing service is now described in more detail. Server 200 in FIG. 2 shows an example of a server for use in a cloud computing service. A cloud computing service may include a number of servers that collectively provide the cloud computing service. Server 200 includes a central processing unit (CPU) 202, read only memory (ROM) 204, random access memory (RAM) 206, communications unit 208, data store 210, and bus 212. Server 200 may have additional components that are not illustrated in FIG. 2. Bus 212 allows the various components of server 200 to communicate with each other. Communications unit 208 allows server 200 to communicate with other devices, such as a number of client computers. Data store 210 may store, among other things, files that may be accessed, viewed, or edited by a number of client computers. These files may include word processing files, presentation files, presentations, or multimedia files. Each file in data store 210 may be associated with an access control list (ACL), which determines the access rights of users attempting to view files in data store 210 (e.g. write access, read access, no access). Users connect with server 200 through communications unit 208 to access files stored in data store 210.

A client computer for accessing files stored on a cloud computing service is now described in more detail. Client computer 300 in FIG. 3 includes a central processing unit (CPU) 302, read only memory (ROM) 304, random access memory (RAM) 306, input/output interface 308, web browser 310, and bus 312. Client computer 300 may have additional components that are not illustrated in FIG. 3. Bus 312 allows the various components of client computer 300 to communicate with each other. Input/output interface 308 allows client computer 300 to communicate with other devices, such as a cloud computing service, and also includes devices for taking in user inputs and displaying outputs to a user. Web browser 310 is used, among other things, to provide a user interface to view and edit files stored on a cloud computing service. Web browser 310 also displays mutations made by other collaborators who may be editing the same file as the user of client computer 300. The cloud computing service may determine the layout of the user interface displayed on web browser 310 for accessing and viewing files.

Figure 3:
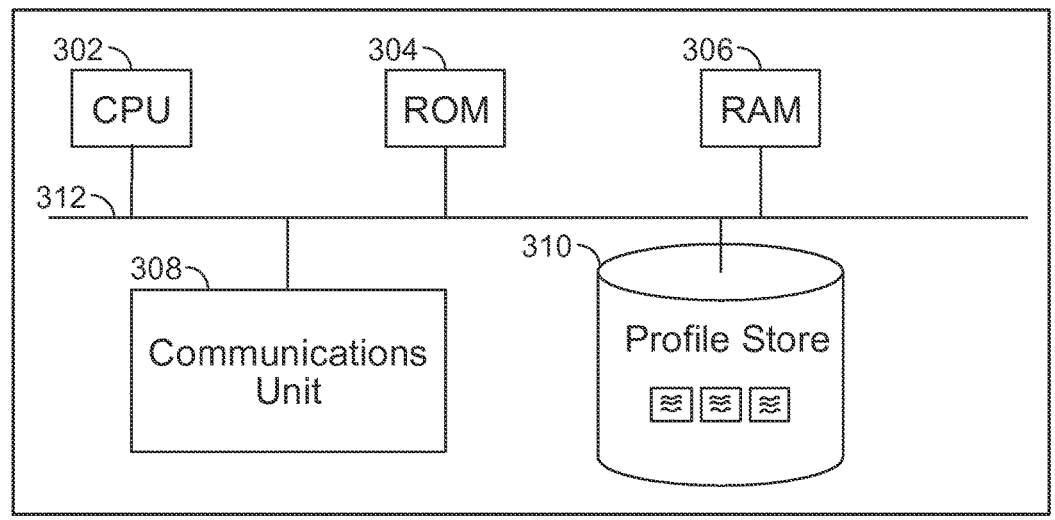
FIG. 3 shows a client computer for loading a presentation stored on a cloud computing service in accordance with an implementation as described herein.

Data store 210 for files stored on cloud computing service 200 in FIG. 2, web browser 310 for client computer 300 in FIG. 3, and other data structures and software programs on cloud computing service 200 and client computer 300 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and readable, once-writable, or rewriteable CD-ROM and DVD-ROM disks.

Figure 4A:
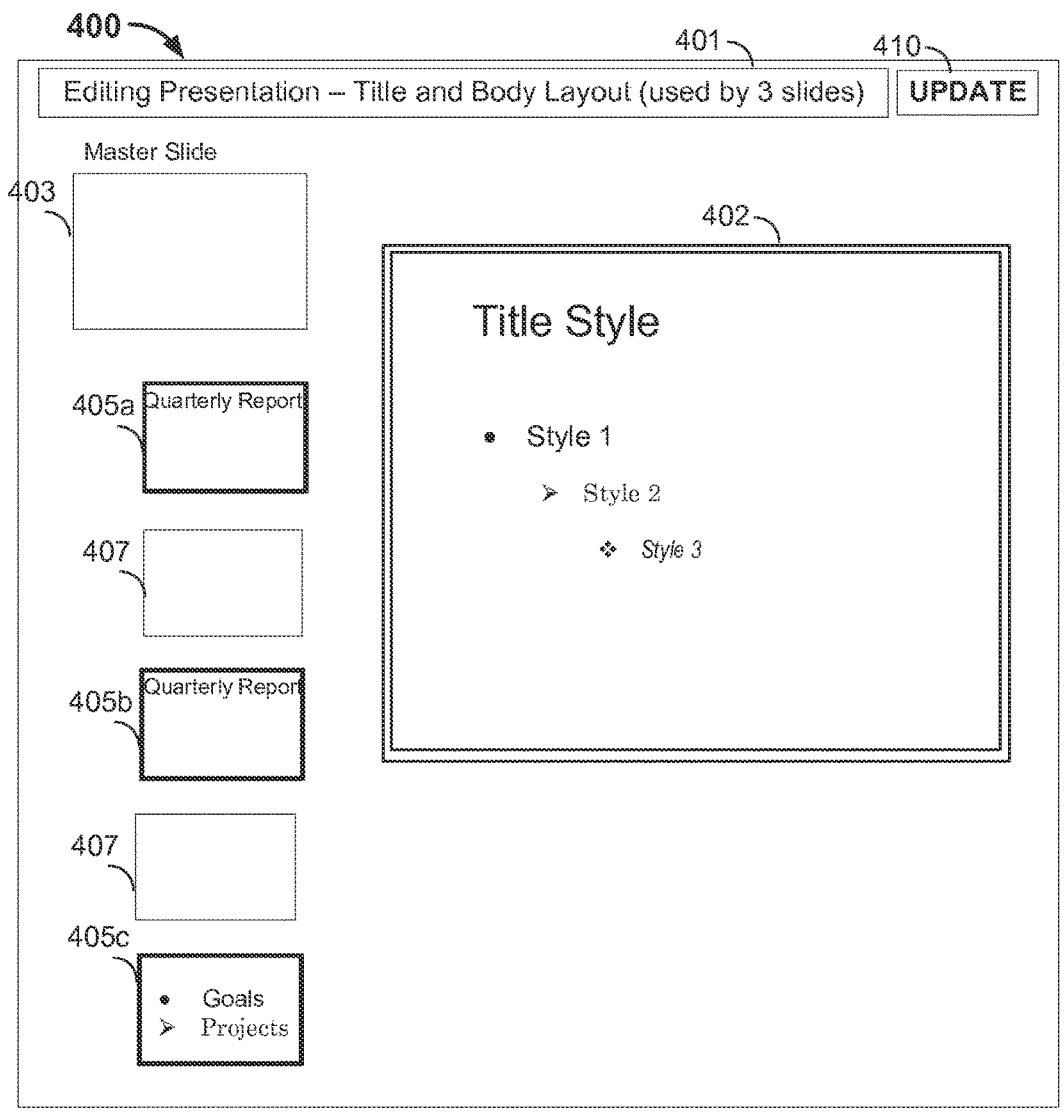
FIGS. 4A-B show examples of previews of a master slide and other slides in a presentation in accordance with an implementation as described herein.

FIG. 4A shows an example of a presentation editing display 400 which may be provided using a browser on a client computer 104. As shown, the display 400 includes a master slide 402 which includes certain text elements, for example, title and other styles. Those styles can be used in dependent slides of the presentation to create a consistent appearance throughout the presentation. In addition, certain images or other media elements may be used for a background image for the master slide to be applied to dependent slides. The display 400 may also include text information 401 which can indicate to the user information about the presentation, for example, that certain master layout features are applied to certain slides in the presentation, and how many slides are associated with the master, or other information. When the user edits the master slide, the dependent slides may be shown in a preview on the side of the master slide, e.g., slides 405 and 407. As shown, certain slides 405a-405c have a visual indicator, namely a dark border which highlights to the user that those slides are dependent or otherwise associated with the master slide and are affected by any changes the user may make to the master slide. In contrast, slides 407 are not associated with the master slide and are shown without any markings or highlights. The difference in the previews of slides 405 and 407 is meant to make it clear to the user that only certain highlighted slides 405 will be changed by any edits the user makes to the master slide. The highlights may be shown using different colors, slide sizes, or other scheme to differentiate the dependent slides from the unaffected slides.

Changes made to the master slide 402 may be propagated to the dependent slides at the time the edits are entered in the master slide. The preview version of the affected slides may include updates based on such changes. As changes are made to the master slide, the changes are shown in the preview. Highlighting to the user which dependent slides are affected by changes to the master allows the use to fully realize the impact of the master slide changes.

Figure 4B:
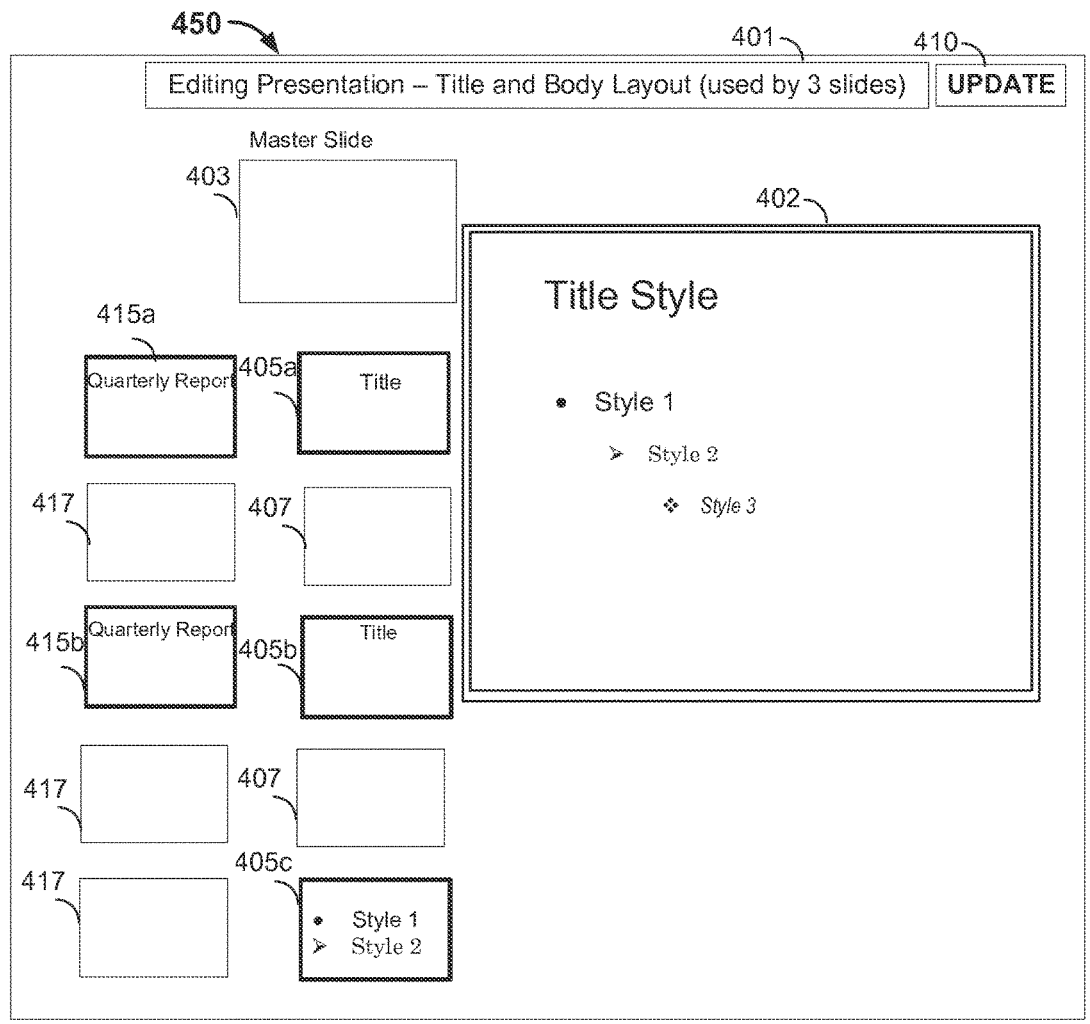

FIG. 4B shows an example of a presentation editing display 450 which may be provided using a browser on a client computer 104. In display 450, a master slide 402 may be edited and a preview of the other presentation slides may be shown adjacent the master slide 402. As shown, dependent slides 405*a-c* which have layouts affected by the master slide edits are shown highlighted as in FIG. 4A. In addition, a filmstrip of specific slides 415*a-b* that are affected by layout edits to a Title Style are shown with a highlighted border to distinguish affected slides from non-affected slides, e.g., slides 417.

Figure 5:
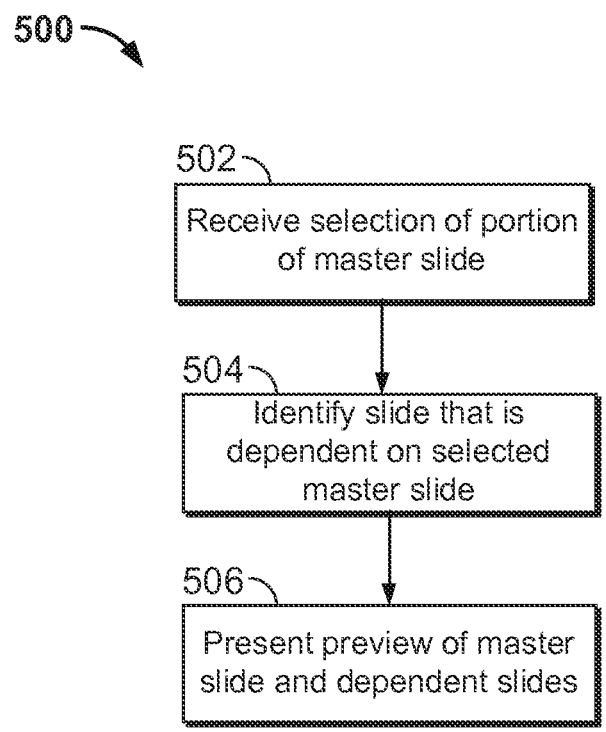
FIGS. 5-6 show methods for presenting a preview of a dependent slide in a presentation in accordance with an implementation as described herein.

Methods are now described for highlighting dependent slides of a presentation. FIG. 5 depicts a method 500 for highlighting dependent slides. The method includes receiving a selection of a portion of a master slide, identifying any dependent slides to the master, and presenting a preview of the dependent slides. In general, master slides are edited in a master slide editing mode of a presentation application. When a user initiates the master slide editing mode of a presentation application, the view of the presentation may change to show only a master slide. When the user makes a selection in the master slide, for example, an edit of a presentation element, the selection is received by the server at 502. At 504 the server 200 may determine whether there are any dependent slides to the master slide that is being edited. The determination may be made by the server 200 by querying a file index, for example, in the data store 210 to determine whether any slides dependencies to the master slide exist. Any identified dependent slides may be presented in a preview at 506. The preview is provided in a display on the client computer, for example, in a browser, or in an application interface if the application is installed on the client. The preview of the dependent slides is shown with a visual indicator, for example, a highlight of the dependent slides so that they are distinguishable from any slides in the presentation that are not affected by changes to the master slide. Method 500 may be performed by a document editing program installed on a client computer, or by a document editing interface provided by a cloud computing service and displayed on a web browser executing on the client computer. Examples of client computers for performing method 500 are shown in FIGS. 1 and 2.

Figure 6:
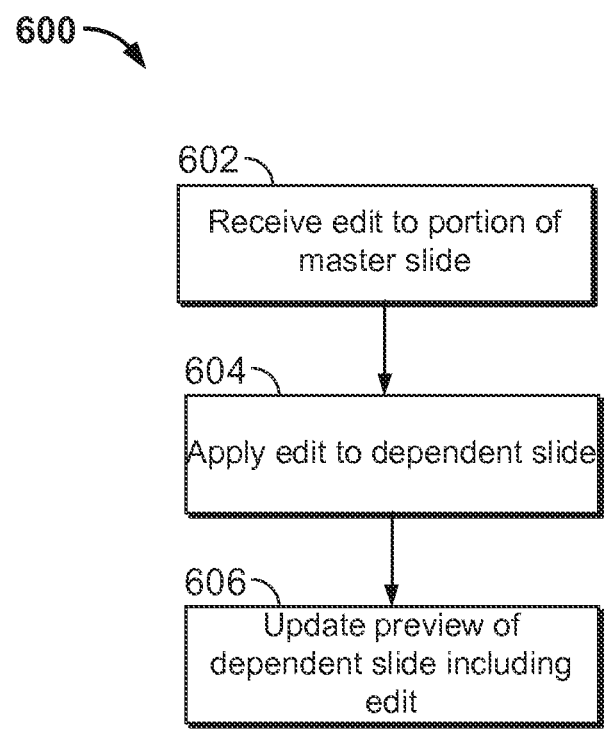

Changes made to the master slide may be shown in a dependent slide according to method 600 depicted in FIG. 6. As shown, the method includes receiving an edit to a portion of a master slide, applying the edit to a dependent slide, and presenting a preview of the dependent slide including the edit. When the user enters an edit to a portion of a master slide of a presentation, for example, in a master slide editing mode, the edit may be received, at 602, by the server 200. The server 200 may determine whether any dependent slides are affected by the changes to the master slide by querying a file index in, for example, data store 210. The edits to the master slide are applied to the dependent slides at 604. The edits may be applied by the server 200 and updated in the corresponding dependent slides. The updated slides may be shown in a preview mode including the edits at 606. The preview may be provided in a display of the master slide editor interface and may include the dependent slides shown with a visual indicator or highlighting to distinguish the changed slides from other slides in the presentation that are not affected by the edits to the master slide.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for displaying changes to a master slide for a presentation, the method comprising:
   receiving from a user on a client computer, a selection of a portion of the master slide in a presentation document comprising a plurality of slides;
   identifying at least one slide in the presentation document that is dependent on the master slide; and
   providing, for display at the client computer, a presentation editing user interface comprising an editable view of the master slide and a preview of the plurality of slides in the presentation document, the preview of the plurality of slides comprising the at least one dependent slide and one or more other slides that are not dependent on the master slide, wherein each dependent slide is automatically updated in the preview as edits are made to the master slide, wherein the at least one dependent slide is to include a visual indicator in the preview, wherein the visual indicator distinguishes the dependent slide from the other slides in the preview that are not dependent on the master slide, and wherein the presentation editing user interface contains a section distinct from the plurality of slides to display a number representing how many slides are dependent on the master slide.

2. The method of claim 1 wherein the visual indicator comprises highlighting the dependent slide.

3. The method of claim 1 further comprising:
   receiving from the user on the client computer an edit to the selected portion of the master slide in the presentation document;
   applying the edit to the dependent slide; and
   displaying in the preview the dependent slide updated based on the edit to the master slide as the edit is applied to the master slide.

4. The method of claim 3 wherein the preview of the dependent slide is updated in substantially real time.

5. The method of claim 1 wherein the view of the master slide and preview of the plurality of slides in the presentation document is provided in a master editing mode for the presentation.

6. The method of claim 1 further comprising: providing information identifying the dependent slide.

7. The method of claim 6 further comprising: providing information identifying a particular element of the dependent slide.

8. The method of claim 6 further comprising: providing information indicating the number of the one or more dependent slide.

9. The method of claim 1 further comprising: associating a second dependent slide with the master slide; and displaying a preview of the second dependent slide including a visual indicator.

10. A system for displaying changes to a master slide for a presentation, the system comprising:

a server in communication with a client computer, the server comprising a processor configured to:

receive from a user on the client computer a selection of a portion of the master slide in a presentation document comprising a plurality of slides;

identify at least one slide in the presentation document that is dependent on the master slide; and provide, for display at the client computer, a presentation editing user interface comprising an editable view of the master slide and a preview of the plurality of slides in the presentation document, the preview of the plurality of slides comprising the at least one dependent slide and one or more other slides that are not dependent on the master slide, wherein each dependent slide is automatically updated in the preview as edits are made to the master slide, wherein the at least one dependent slide is to include a visual indicator in the preview, wherein the visual indicator distinguishes the dependent slide from the other slides in the preview that are not dependent on the master slide, and wherein the presentation editing user interface contains a section distinct from the plurality of slides to display a number representing how many slides are dependent on the master slide.

11. The system of claim 10 wherein the visual indicator comprises highlighting the dependent slide.

12. The system of claim 10 wherein the processor is further configured to:

receive from the user on the client computer an edit to the selected portion of the master slide in the presentation document;

apply the edit to the dependent slide; and display in the preview the dependent slide updated based on the edit to the master slide as the edit is applied to the master slide.

13. The system of claim 12, wherein preview of the dependent slide is updated in substantially real time.

14. The system of claim 10 wherein the view of the master slide and preview of the plurality of slides of the presentation document is provided in a master editing mode for the presentation.

15. The system of claim 10 wherein the processor is further configured to:

provide information identifying the dependent slide.

16. The system of claim 10 wherein the processor is further configured to:

provide information identifying a particular element of the dependent slide.

17. The system of claim 10 wherein the processor is further configured to:

provide information indicating the number of the dependent slide.

18. The system of claim 10 wherein the processor is further configured to:

associate a second dependent slide with the master slide; and display a preview of the second dependent slide including a visual indicator.

19. A non-transitory computer-readable medium comprising instructions which when executed by a processing device cause the processing device to perform operations comprising:

receiving from a user on a client computer, a selection of a portion of a master slide in a presentation document comprising a plurality of slides;

identifying at least one slide in the presentation document that is dependent on the master slide; and providing, for display at the client computer, a presentation editing user interface comprising an editable view of the master slide and a preview of the plurality of slides in the presentation document, the preview of the plurality of slides comprising the at least one dependent slide and one or more other slides that are not dependent on the master slide, wherein each dependent slide is automatically updated in the preview as edits are made to the master slide, wherein the at least one dependent slide is to include a visual indicator in the preview, wherein the visual indicator distinguishes the dependent slide from the other slides in the preview that are not dependent on the master slide, and wherein the presentation editing user interface contains a section distinct from the plurality of slides to display a number representing how many slides are dependent on the master slide.

20. The non-transitory computer-readable medium of claim 19 wherein the visual indicator comprises highlighting the dependent slide.

* * * * *